United States Patent
Gruber et al.

(10) Patent No.: US 10,323,598 B2
(45) Date of Patent: Jun. 18, 2019

(54) METHOD FOR OPERATING A SPARK IGNITED ENGINE

(71) Applicant: INNIO Jenbacher GmbH & Co OG, Jenbach (AT)

(72) Inventors: Friedrich Gruber, Hippach (AT); Nikolaus Spyra, Innsbruck (AT); Christian Trapp, Hall in Tirol (AT); Georg Tinschmann, Schwaz (AT); Ettore Musu, Modena (IT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 240 days.

(21) Appl. No.: 14/877,216

(22) Filed: Oct. 7, 2015

(65) Prior Publication Data
US 2016/0177854 A1 Jun. 23, 2016

(30) Foreign Application Priority Data

Dec. 19, 2014 (AT) ..................... 923/2014

(51) Int. Cl.
*F02D 41/14* (2006.01)
*F02D 41/30* (2006.01)
(Continued)

(52) U.S. Cl.
CPC ...... *F02D 41/1498* (2013.01); *F02B 19/1004* (2013.01); *F02B 19/1023* (2013.01);
(Continued)

(58) Field of Classification Search
CPC .. F02D 41/1498; F02D 41/0025; F02D 37/02; F02D 41/0085; F02D 19/0642;
(Continued)

(56) References Cited

U.S. PATENT DOCUMENTS 4,940,033 A * 7/1990 Plee ................. F02D 35/02
123/406.28
5,113,828 A * 5/1992 Remboski ............. F02D 35/022
123/406.28
(Continued)

FOREIGN PATENT DOCUMENTS

AT 5134 U1 3/2002
AT 414265 B 10/2006
(Continued)

OTHER PUBLICATIONS

Austrian Search Report dated Jun. 29, 2015 in corresponding Austrian Patent Application No. 923/2014 (with English translation).
(Continued)

*Primary Examiner* — Joseph J Dallo
(74) *Attorney, Agent, or Firm* — Fletcher Yoder, P.C.

(57) ABSTRACT

A method includes forming a combustible mixture by mixing generally homogeneously a first fuel and air and introducing this mixture into a cylinder, compressing the combustible mixture with a piston in a compression stroke, introducing a second fuel into a prechamber at an introduction-time before start of combustion thus creating a prechamber charge, in which the second fuel being of the same or different chemical composition and/or concentration with respect to the first fuel, and spark igniting the prechamber charge. Emission of the cylinder and/or mechanical stress of the cylinder caused by the combustion are monitored. If emissions and/or mechanical stress are above respective predetermined thresholds, individually for the at least one cylinder, the chemical composition and/or the amount of second fuel introduced into the prechamber, and/or temperature of the cylinder charge and/or spark timing, are changed.

20 Claims, 3 Drawing Sheets

(51) Int. Cl.

| | | |
|---|---|---|
| *F02B 19/10* | (2006.01) | |
| *F02B 19/12* | (2006.01) | |
| *F02D 41/00* | (2006.01) | |
| *F02P 5/04* | (2006.01) | |
| *F02D 19/06* | (2006.01) | |
| *F02D 37/02* | (2006.01) | |
| *F02B 5/02* | (2006.01) | |
| *F02D 13/02* | (2006.01) | |
| *F02D 35/02* | (2006.01) | |

(52) U.S. Cl.
CPC .......... *F02B 19/1085* (2013.01); *F02B 19/12* (2013.01); *F02D 19/0642* (2013.01); *F02D 37/02* (2013.01); *F02D 41/0025* (2013.01); *F02D 41/0027* (2013.01); *F02D 41/0085* (2013.01); *F02D 41/146* (2013.01); *F02D 41/3035* (2013.01); *F02P 5/045* (2013.01); *F02B 5/02* (2013.01); *F02D 13/0207* (2013.01); *F02D 13/0273* (2013.01); *F02D 35/02* (2013.01); *F02D 41/006* (2013.01); *Y02T 10/125* (2013.01); *Y02T 10/36* (2013.01)

(58) Field of Classification Search
CPC ............. F02D 41/0027; F02D 41/3035; F02D 41/146; F02B 19/1085; F02B 19/12; F02B 19/1023; F02B 19/1004; F02P 5/045; Y02T 10/36
See application file for complete search history.

(56) References Cited

U.S. PATENT DOCUMENTS

| | | | | |
|---|---|---|---|---|
| 5,611,307 A * | 3/1997 | Watson | ............... | F02B 19/1014 123/254 |
| 6,032,617 A | 3/2000 | Willi et al. | | |
| 6,041,591 A * | 3/2000 | Kaneko | ................. | F02D 41/024 123/300 |
| 6,230,683 B1 * | 5/2001 | zur Loye | ................... | F02B 1/12 123/27 GE |
| 6,276,334 B1 * | 8/2001 | Flynn | ..................... | F02B 19/14 123/435 |
| 6,463,907 B1 | 10/2002 | Hiltner | | |
| 6,550,430 B2 | 4/2003 | Gray | | |
| 6,659,071 B2 | 12/2003 | LaPointe et al. | | |
| 6,912,992 B2 | 7/2005 | Ancimer et al. | | |
| 7,007,669 B1 * | 3/2006 | Willi | ................... | F02D 13/0269 123/305 |
| 7,036,482 B2 | 5/2006 | Beck et al. | | |
| 7,757,659 B2 | 7/2010 | Kurotani et al. | | |
| 7,922,551 B2 * | 4/2011 | Tozzi | ..................... | F02B 19/08 123/169 EL |
| 9,091,222 B2 | 7/2015 | Furukawa | | |
| 2002/0092488 A1 * | 7/2002 | Aoyama | ............. | F01L 13/0021 123/90.16 |
| 2002/0185107 A1 * | 12/2002 | Kubesh | ................. | F02D 41/146 123/406.44 |
| 2004/0112329 A1 | 6/2004 | Coleman et al. | | |
| 2004/0221831 A1 | 11/2004 | Chmela et al. | | |
| 2005/0121008 A1 * | 6/2005 | Kilkenny | ................. | F01L 9/02 123/568.14 |
| 2006/0011179 A1 | 1/2006 | Robitschko et al. | | |
| 2007/0021164 A1 * | 1/2007 | Lind | .................. | G06Q 30/0209 463/1 |
| 2007/0144459 A1 | 6/2007 | Fiveland | | |
| 2007/0186902 A1 * | 8/2007 | Zhu | ........................ | F02P 17/12 123/406.34 |
| 2007/0186903 A1 * | 8/2007 | Zhu | ....................... | F01N 3/2006 123/406.37 |
| 2008/0000445 A1 | 1/2008 | Kim et al. | | |
| 2009/0043479 A1 * | 2/2009 | Noda | ...................... | F02D 13/02 701/103 |
| 2009/0182483 A1 | 7/2009 | Loeffler et al. | | |
| 2011/0180035 A1 * | 7/2011 | Durrett | .................. | F02B 17/005 123/295 |
| 2011/0308495 A1 | 12/2011 | Furukawa | | |
| 2012/0103302 A1 | 5/2012 | Attard | | |
| 2012/0160221 A1 | 6/2012 | Munshi et al. | | |
| 2012/0173125 A1 | 7/2012 | Baumgarten et al. | | |
| 2012/0222639 A1 * | 9/2012 | Knauf | ................. | F01L 13/0021 123/90.44 |
| 2013/0055985 A1 | 3/2013 | Gruber et al. | | |
| 2013/0179050 A1 * | 7/2013 | Munshi | .................... | F02B 43/10 701/104 |
| 2013/0263797 A1 * | 10/2013 | Sugiura | ..................... | F01P 3/00 123/41.01 |
| 2014/0069380 A1 * | 3/2014 | Leone | ........................ | F02D 9/04 123/406.12 |
| 2014/0076289 A1 * | 3/2014 | Ruona | .................. | F02B 29/0425 123/542 |
| 2014/0260782 A1 * | 9/2014 | Paschen | .................. | F16F 7/108 74/574.4 |
| 2014/0261322 A1 * | 9/2014 | Geckler | ............. | F02D 41/0065 123/445 |
| 2014/0299107 A1 * | 10/2014 | Iwai | ...................... | F02D 41/006 123/478 |
| 2015/0369101 A1 * | 12/2015 | Leone | ................... | F02D 41/025 123/406.12 |

FOREIGN PATENT DOCUMENTS

| | | |
|---|---|---|
| CN | 101363372 A | 2/2009 |
| CN | 102112723 A | 6/2011 |
| CN | 103958865 A | 4/2017 |
| DE | 10348366 A1 | 5/2004 |
| EP | 1203875 A1 | 5/2002 |
| EP | 2 402 582 | 1/2012 |
| JP | 10-502717 | 3/1998 |
| JP | 2001-20784 | 1/2001 |
| JP | 2002180879 A | 6/2002 |
| JP | 2004197744 A | 7/2004 |
| JP | 2009168029 A | 7/2009 |
| JP | 2010270719 A | 12/2010 |
| JP | 2013-209967 | 10/2013 |
| JP | 2014029131 A | 2/2014 |
| JP | 2016-75275 | 5/2016 |
| JP | 2016-75278 | 5/2016 |
| JP | 2016-138546 | 8/2016 |
| WO | 2001059280 A1 | 8/2001 |
| WO | 2010149362 A1 | 12/2010 |
| WO | 2013/093200 | 6/2013 |
| WO | 2014/147978 A1 | 9/2014 |

OTHER PUBLICATIONS

European Search Report dated Jul. 11, 2016 in corresponding European Application No. 15 00 2862, with English translation.
Japanese Office Action issued in connection with corresponding JP Application No. 2015240908 dated Sep. 26, 2017.
Machine Translation and First Office Action and Search issued in connection with corresponding CN Application No. 201510940595.3 dated Jan. 22, 2018.

* cited by examiner

METHOD FOR OPERATING A SPARK IGNITED ENGINE

The present invention is directed to a method for operating a spark ignited engine with the features of the preamble of claim 1 and a spark ignited engine with the features of the preamble of claim 19.

When designing internal combustion engines there are conflicting requirements between the reduction of different types of emissions like nitrogen oxides (NOx), unburnt hydrocarbons (HC) and carbon monoxide (CO).

A promising approach to realize highly efficient and low emission combustion is the HCCI-concept (homogeneous charge compression ignition). Here, the ignition of a highly diluted (lean and/or with high rate of exhaust recirculation, EGR) and homogeneous fuel-air-mixture is effected through the temperature increase during the compression stroke close to the upper dead center of the piston. The very dilute fuel-air-mixture allows combustion with extremely low values for nitrogen oxides (NOx). Auto-ignition of the fuel-air-mixture in the combustion chamber is achieved through a combination of various measures, as for example a high geometric compression ratio $\varepsilon$ and pre-heating of the charge through suitable measures (for example pre-heating of the intake air or exhaust gas recirculation, EGR).

As according to the HCCI combustion concept the fuel-air-mixture ignites more or less simultaneously in the whole combustion chamber close to top dead center, the combustion event is extremely rapid.

There are several problems connected with the HCCI concept. Combustion is hard to control. A second fuel with different auto-ignition properties compared to the first fuel is a known concept to improve controllability. This of course has the disadvantage of requiring the handling of a second fuel.

In contrast, in spark ignited engines the combustion timing can be easily controlled by the spark timing. In large spark ignited engines (typically with cylinder bores of 150 mm and more) prechambers are provided in which ignition is initiated.

Also known from prior art are concepts to control prechamber type spark ignited engines. JP2013209967, for example, shows an active prechamber wherein the amount of fuel supplied to the prechamber can be controlled in order to prevent misfire.

It is an object of the invention to provide a method for operating a spark ignited engine and a spark ignited engine which combine the benefits of the HCCI concept and the easy controllability of a spark ignited engine.

This object is being achieved by a method according to claim 1 and a spark ignited engine according to claim 19.

According to the invention, the energy content of the prechamber and/or the chemical composition of the prechamber charge is being used as a control means to control the combustion process in the mainchamber.

It has to be noted that due to the fluid connection between the prechamber and the main chamber, whenever we talk about "cylinder charge" what is meant is the charge of the combined volume of the main chamber and the prechamber.

The invention can be carried out best if it is provided that a valve that is providing the introduction of air and/or second fuel into the prechamber can be actively and individually controlled for each prechamber provided in the engine.

It is advantageous to have a very fast combustion in the main chamber with a very diluted (lean) cylinder charge. Having a very fast combustion increases the efficiency of the combustion and decreases HC emissions. Due to the high dilution NOx emissions are low and knock tendency is being reduced.

Although the cylinder charge is very lean, by controlling the temperature of the cylinder charge and influencing the energy content and/or chemical composition of the prechamber charge, ignition and fast combustion of the very lean cylinder charge is possible.

Using an active prechamber allows varying the energy content and the chemical composition of the prechamber charge between individual prechambers.

With respect to gases all numbers given in % relate to volume percentage.

The first fuel can be natural gas or a mixture of natural gas and carbon dioxide (CO2) such that the amount of CO2 and methane (CH4) ist higher than 80%. The second fuel can be natural gas or a combination of natural gas and a gas with H2 higher than 10% in volume.

By providing that emission of the at least one cylinder and/or mechanical stress of the at least one cylinder caused by the combustion are being monitored and if emissions and/or mechanical stress are above respective predetermined thresholds, individually for the at least one cylinder, change the amount and/or the composition of the second fuel introduced into the prechamber, and/or temperature of the cylinder charge spark timing such that emissions and/or mechanical stress go down below their respective predetermined thresholds, it is achieved that one can much better operate the combustion engine at different ambient conditions as for example ambient temperature, humidity, altitude at which the engine is being operated. What is meant by mechanical stresses, which can be controlled by the present method in very beneficial way, are in particular mechanical loads, as they can for example occur by a too high break mean effective pressure, BMEP or a too high peak firing pressure, PFP.

Also with regard to mechanical tolerances —that are necessarily present with an internal combustion engine—by the present method one can much better compensate variations between individual cylinders present with respect to energy content and chemical composition present in individual prechamber charges, compression ratio, gas exchange, deposits, etc.

If fuel quality changes, too. It can be provided that monitoring emission of the at least one cylinder and/or mechanical stress of the at least one cylinder caused by the combustion is being carried out by measuring signals characteristic for the combustion event in the at least one cylinder.

It is not required to measure emissions directly but use combustion characteristics instead. This could be done in various ways: It can—for example—be provided that the step of measuring signals characteristic for the combustion event in the at least one cylinder comprises determining a characteristic position in time of the combustion event and/or duration of the combustion event. Such characteristic position in time of the combustion could be for example the center of gravity of combustion. Typically, center of gravity and combustion duration are acquired by means of incylinder pressure measurement; however, alternative approaches are ion-current measurements or optical approaches. Duration of combustion, also "burn duration" is a measure of the burn progress in a combustion cycle, expressed as mass fraction burned during a certain crank angle. For example, the burn duration of $\Delta\theta_{0-10\%}$ of 15° crank angle means that 10% of the charge mass has burned during 15° crank angle revolution. The combustion center of gravity indicates the state in which half of the fresh charge is burned. It is also known as MFB50, i.e. 50% mass fraction burned. The terms can be found in textbooks on internal combustion engines, see in particular Heywood, John B., Internal Combustion Engine Fundamentals, New York, McGraw-Hill, 1988.

For the understanding of flame speed the following definitions shall apply in the context of the present invention:

As described in the relevant literature, the laminar flame speed of a gas or a gas mixture is the speed at which the flame of the ignited gas or gas mixture propagates normal relative to the flame front relative to the unburnt gas or gas mixture. In accordance with the invention a charge with a low flame speed is interpreted as being a gas or gas mixture having a low laminar flame speed. As an example, a gas or gas mixture having a laminar flame speed of less than 10 cm/s would be a charge with a low flame speed.

Generally, values given are under normal conditions as described in the relevant literature, that is to say for example with a combustion air ratio of 1 and at atmospheric pressure.

Methods for determining the laminar flame speed of a gas are known in the state of the art, like for example by known experimental methods like the Bunsen burner method or the flat flame method. In addition the man skilled in the art also knows of numerical calculation methods by which the laminar flame speed of a gas can be calculated from its gas composition.

It can be provided that the step of changing the amount and/or chemical composition of the second fuel introduced into the prechamber comprises reducing the amount of the second fuel if the mechanical stress is too high.

By changing the amount of the second fuel introduced and/or the chemical composition of the prechamber charge such that the energy amount and/or the flame speed in the prechamber is decreased, mechanical stress can be reduced.

By reducing the amount of the second fuel and/or adjusting the chemical composition of the prechamber charge the combustion is delayed thereby the peak firing pressure is reduced, thus reducing the mechanical stresses to the engine.

It can also be provided that the step of changing the temperature of the cylinder charge comprises lowering the temperature of the cylinder charge if the mechanical stress is too high. This can for instance be achieved through lowering the intake temperature of first fuel and intake charge. Intake charge is being understood as describing either a mixture of first fuel and air or air alone.

With regard to emissions it can be provided that the step of monitoring emission of the at least one cylinder comprises differentiating between NOx and HC emissions. This differentiation is done through monitoring combustion characteristics, decisive for the formation of the specific emission species. That is, for example, at a given lambda, mixture homogeneity and given EGR rate, the NOx emissions largely depend on the combustion position, that is the center of gravity. The earlier the center of gravity is (expressed as crank angle) the higher the NOx formation, the later the combustion position the lower the NOx formation. NOx formation is also effected by the combustion speed, expressed as combustion duration (e.g. the crank angle value for $\Delta\theta_{10-90\%}$). The relationship is such that a high combustion speed (small $\Delta\theta$) results in higher NOx, while a slower combustion speed results in lower NOx. This is because in case of high combustion speeds, the majority of the combustion takes place close to TDC, thus at relatively high temperatures. As the temperature is the governing parameter for NOx formation, this results in high NOx values for high combustion speeds. For HC emission, the following characteristics are relevant for their formation: the higher the combustion temperature, the lower the HC formation. That is, for HC emissions the relationship to combustion parameters given above is just opposite to the relationship for NOx formation. Therefore it can be provided that if NOx emissions are too high the amount of the second fuel introduced into the prechamber is being reduced and/or the chemical composition of the prechamber charge is being changed such that flame speed is being reduced and/or the temperature of the cylinder charge is being decreased.

As the amount of second fuel introduced into the prechamber and/or the chemical composition of the prechamber charge determines the duration of combustion in the main chamber after ignition of the prechamber, the prechamber also influences NOx formation.

Wherein reducing the amount of second fuel introduced into the prechamber and/or changing the chemical composition of the prechamber charge such that flame speed decreases affects a longer duration of combustion in the main chamber, thus lower NOx formation.

If NOx emissions are too high the amount of the second fuel introduced into the prechamber is being changed in a way to decrease the energy amount delivered by the second fuel into the prechamber.

In turn if HC emissions are too high the amount of the second fuel introduced into the prechamber is being increased and/or changing the chemical composition of the prechamber charge such that flame speed is increased and/or the spark timing is being advanced and/or the temperature of the cylinder charge is being increased. The temperature of the cylinder charge can be increased for example by using either external and/or internal EGR. Alternatively or in addition, the air temperature could be increased. The step of changing the temperature of the cylinder charge can be effected by external EGR such that if the temperature of the cylinder charge shall be increased the external EGR rate is increased, if the temperature of the cylinder charge shall be decreased the external EGR rate is decreased.

That is, if NOx emissions are too high the amount of the second fuel introduced into the prechamber is being reduced and/or the chemical composition of the prechamber charge ist being changed such that flame speed is decreased and/or the spark timing is being retarded and/or the temperature of the cylinder charge is being decreased.

With respect to emissions it can be noted that according to the inventive method:

NOx emissions are very low because a very high air-fuel-ratio (very lean mixture) can be used which would not be possible in a spark-ignited engine, for example. It is also important that both the first and the second fuel are pre-mixed with air or cylinder charge before the start of combustion CO and HC emissions are low because combustion is fast and finishes close to the top dead center and temperature of the cylinder charge is high.

Soot emissions are low because both the first and the second fuel are pre-mixed with air or cylinder charge.

Alternatively, or additionally, if the engine is equipped with a variable valve train, capable of varying individually with respect to the at least one cylinder the exhaust and/or intake valve timing and/or valve lift curves, it can be provided that the step of changing the temperature of the cylinder charge is effected by way of the variable valve train—preferably by closing the exhaust valve earlier to increase the temperature of the cylinder charge or closing the exhaust valve later to decrease temperature of the cylinder charge, respectively. Besides the actuating times, also lift curves can possibly be controlled in a variable valve train. The lift curve describes the respective position of the valves relative to closed state in terms of crank angle. By changing valve lift curves the residual amounts of exhaust gas can be modulated in a very beneficial way. When the exhaust valves re-open or are kept open during the intake phase, exhaust gases are flowing back to the cylinder, thus increasing the cylinder charge temperature. As another example, if the intake valves are opening also during the exhaust stroke, exhaust gases are flowing into the intake system, thus increasing the charge temperature in the intake, in consequence, when the intake valve are then opened during the regular intake process, the charge temperature is increased.

Further it can be provided that the step of changing the temperature of the cylinder charge is affected by way of the variable valve train by re-opening an already closed exhaust valve in the intake stroke of the piston thereby increasing the temperature of the cylinder charge. This has the particular advantage that the in-cylinder charge temperature can be controlled cylinder-individually. It is further beneficial that the valve timing can be changes on a cycle to cycle basis, that is, the control response is very rapid.

As a further alternative it can be provided that the step of changing the temperature of the cylinder charge is affected by way of the variable valve train by re-opening a closed intake valve during the exhaust stroke of the piston thereby increasing the temperature of the cylinder charge.

By changing the valve timing the amounts of residual exhaust gases in the cylinders are changed, thus the rate of internal EGR is varied. Since the residual exhaust gas temperature is very high, this measure is very effective to increase the charge temperature.

It can be provided that the step of changing the temperature of the cylinder charge is effected by way of the variable valve train—preferably by closing the exhaust valve in a way to increase the internal EGR and therefore increase the temperature of the cylinder charge or closing the exhaust valve in a way to decrease the internal EGR and therefore to decrease temperature of the cylinder charge, respectively.

It can be provided that the step of changing the temperature of the cylinder charge is affected by way of the variable valve train by re-opening an already closed exhaust valve in the intake stroke of the piston thereby increasing the temperature of the cylinder charge. It can be provided that the step of changing the temperature of the cylinder charge is affected by way of the variable valve train by re-opening a closed intake valve during the exhaust stroke of the piston thereby increasing the temperature of the cylinder charge.

It can be provided that the step of changing the temperature of the cylinder charge comprises either increasing the back-pressure to increase the temperature of the cylinder charge or decreasing the back-pressure to decrease the temperature of the cylinder charge. An increased back pressure level increases the internal EGR rate and vice versa.

It can be provided that the step of changing the temperature of the cylinder charge is affected by an additional introduction of the second fuel into the prechamber and igniting the prechamber charge before combustion in the main chamber in the gas exchange TDC while the intake and exhaust valves are closed. A skilled person will understand the consequences of the measure of controlling the amount of energy released in this first combustion affecting the charge temperature.

The invention is preferred to be operated on a 4-stroke engine, but is by no way limited to a 4-stroke engine. For example, the invention can also be operated on a 2-, 5- or 6-stroke engine.

Other objects and advantages of the invention will become apparent in light of the accompanying drawings, wherein.

Figure 1A:
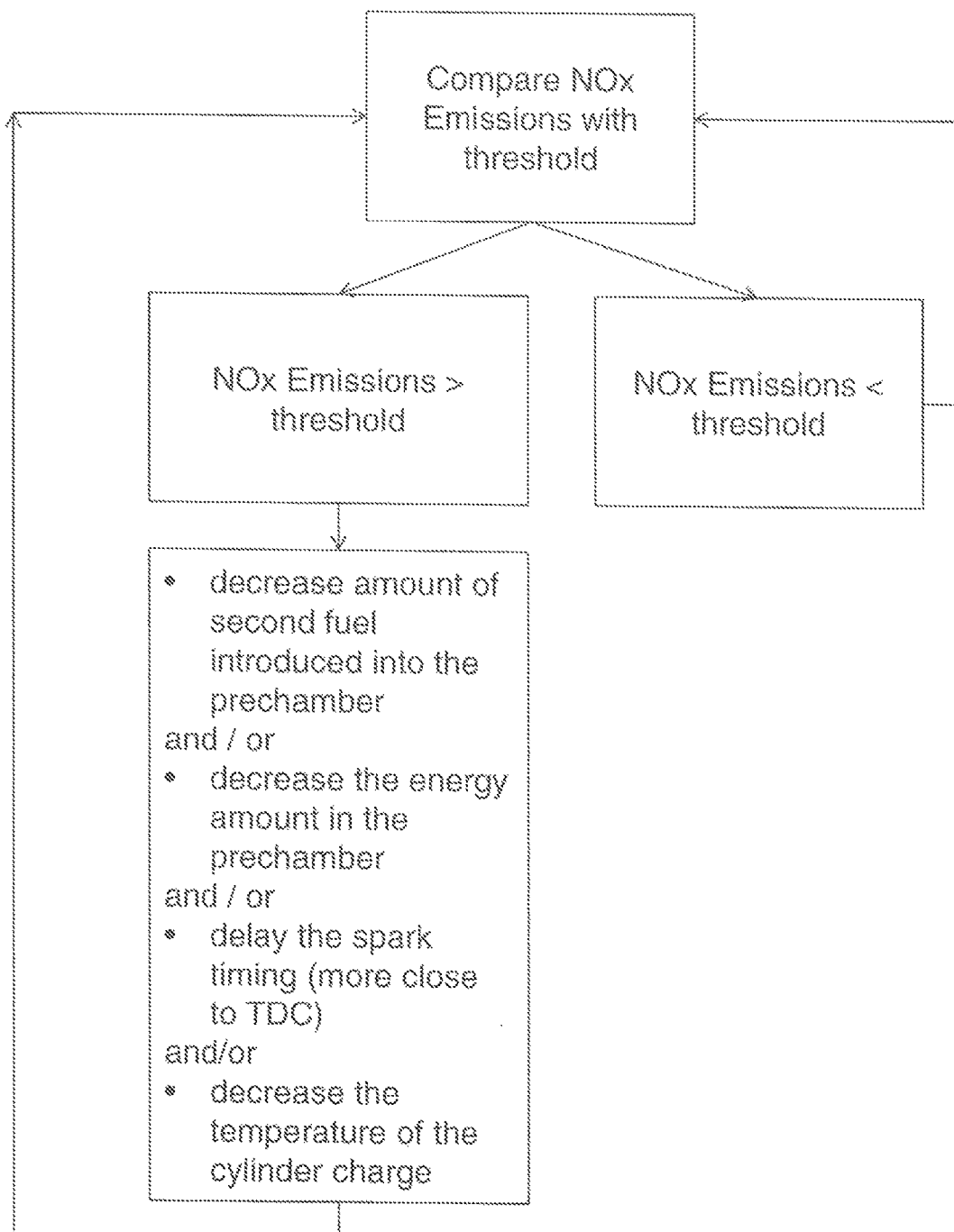
FIG. 1a shows a flow chart of the control logic regarding NOx emissions

FIG. 1a shows a flow chart of the control logic regarding NOx emissions. In a first step the current NOx emissions are compared with a predetermined threshold. In case the NOx emissions do not exceed the predetermined threshold the loop goes back to start. In case the NOx emissions do exceed the predetermined threshold (left side of the flow chart), the one ore more of the following measures are carried out to counter the NOx emissions:

reduce amount of the second fuel introduced into the prechamber decrease the energy amount in the prechamber decrease the temperature of the cylinder charge delay the spark timing (more close to TDC)

After execution of above measures, the loop goes back to the comparison of NOx emissions with a predetermined threshold.

Figure 1B:
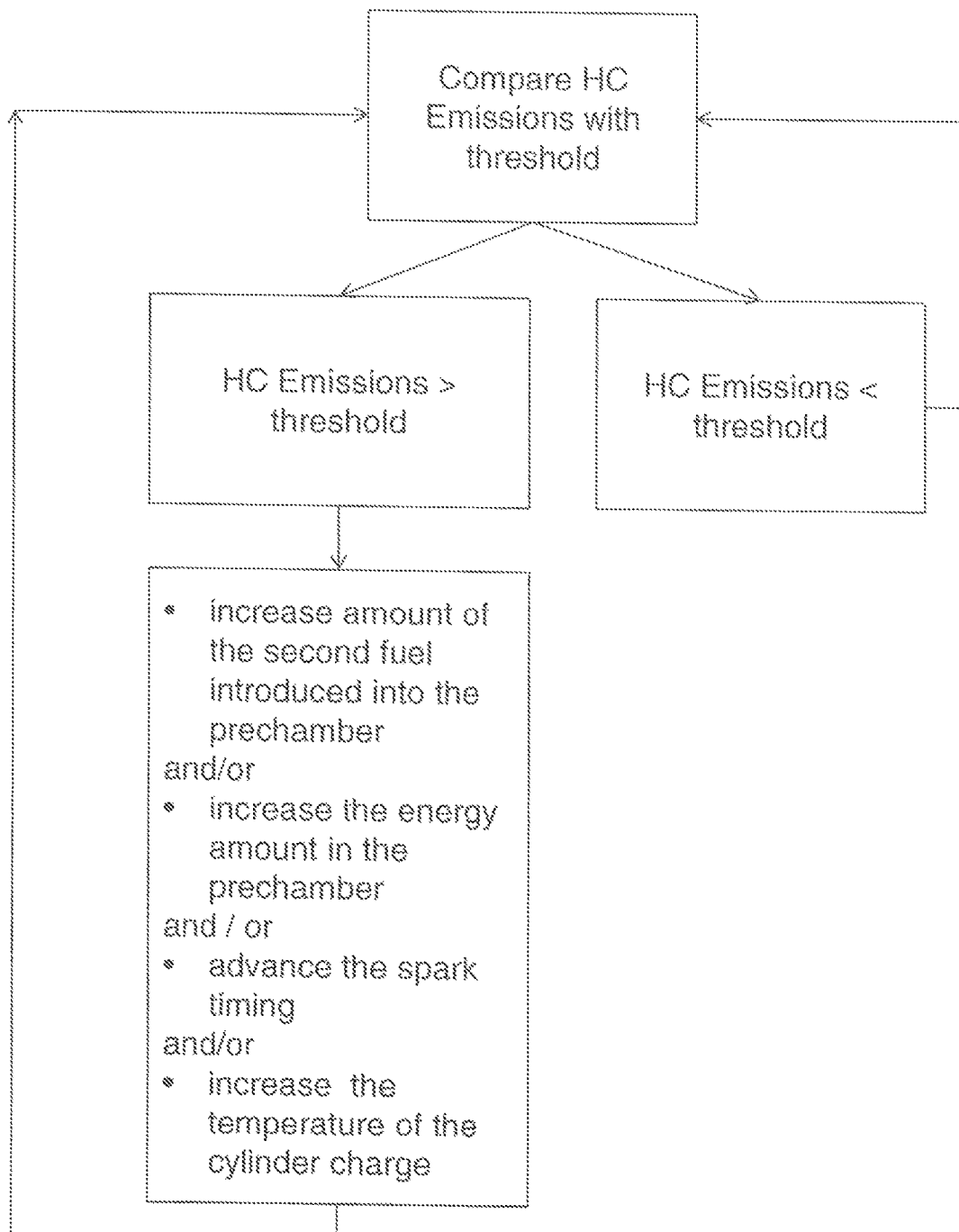
FIG. 1b shows a flow chart of the control logic regarding HC emissions

Similarly, FIG. 1b shows a flow chart of the control logic regarding Hydrocarbon (HC) emissions. In a first step the current HC emissions are compared with a predetermined threshold. In case the HC emissions do not exceed the predetermined threshold the loop goes back to start. In case the HC emissions do exceed the predetermined threshold (left side of the flow chart), one ore more of the following measures are carried out to counter the HC emissions:

increase amount of the second fuel introduced into the prechamber increase the energy amount in the prechamber advance the spark timing increase the temperature of the cylinder charge After execution of above measures, the loop goes back to the comparison of HC emissions with a predetermined threshold.

Figure 2:
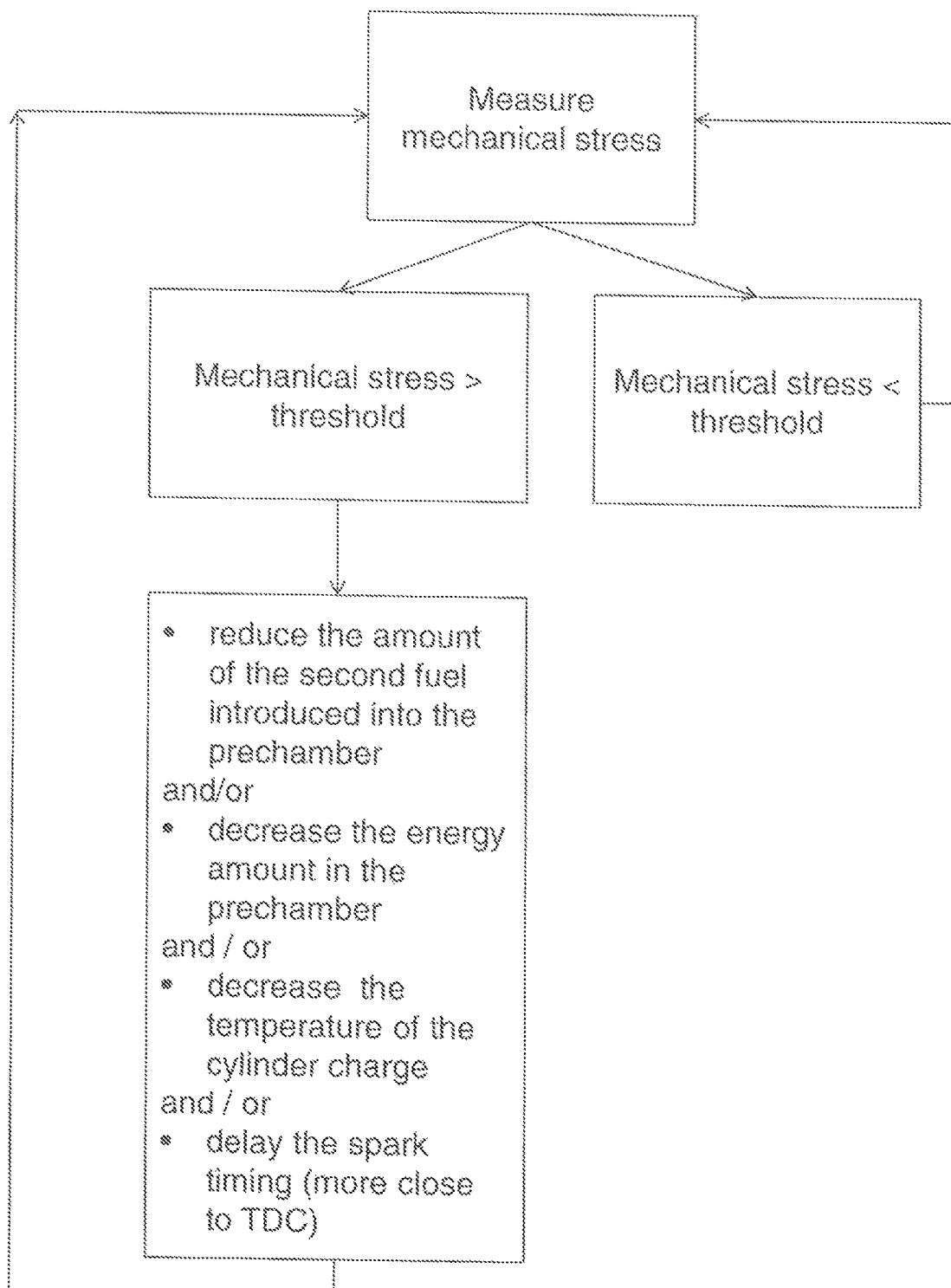
FIG. 2 shows a flow chart of the control logic regarding mechanical stress

FIG. 2 shows a flow chart of the control logic regarding the mechanical loads (stress) on the engine. Signals characteristic for the mechanical stress are being determined by suitable sensors (not shown). The values indicative for mechanical stress are the compared to a predetermined threshold for mechanical stress. In case the values for mechanical stress are below the threshold the loop goes back to start. In case the values for mechanical stress exceed the predetermined threshold, one or more of the following measures are carried out to reduce the mechanical stresses:

reduce the amount of the second fuel introduced into the prechamber decrease the energy amount in the prechamber decrease the temperature of the cylinder charge delay the spark timing (more close to TDC)

After execution of above measures, the loop goes back to the comparison of values for mechanical stress to a predetermined threshold.

The invention claimed is:

1. A method for operating a spark ignited engine, the spark ignited engine having at least one cylinder with a piston movable in the at least one cylinder, and at least one prechamber connected to a main chamber of the at least one cylinder, the method comprising:

forming a combustible mixture by mixing, generally homogeneously, a first fuel and air and introducing the combustible mixture into the at least one cylinder;

compressing the combustible mixture with the piston in a compression stroke;

introducing a second fuel into the at least one prechamber at an introduction-time before start of combustion thus creating a prechamber charge, the second fuel of a same or different chemical composition or concentration with respect to the first fuel;

spark igniting the prechamber charge;

monitoring emission of the at least one cylinder or mechanical stress of the at least one cylinder caused by the combustion; and if emission of the at least one cylinder or the mechanical stress of the at least one cylinder is above respective predetermined thresholds, individually, for the at least one cylinder, changing temperature of a cylinder charge, and at least one of:
the chemical composition of the prechamber charge;
an amount of the second fuel introduced into the prechamber; or
spark timing;

such that the emissions of the at least one cylinder, or the mechanical stress of the at least one cylinder decreases below the predetermined thresholds.

2. The method according to claim 1, wherein the first fuel is natural gas or a mixture of the natural gas and CO2 such that an amount of CO2 and CH4 is higher than 80%.

3. The method according to claim 1, wherein the second fuel is natural gas or a combination of natural gas and a gas with H2 higher than 10% in volume.

4. The method according to claim 1, wherein monitoring the emission of the at least one cylinder or the mechanical stress of the at least one cylinder caused by the combustion is accomplished by measuring signals characteristic for the combustion in the at least one cylinder.

5. The method according to claim 4, wherein measuring signals characteristic for the combustion in the at least one cylinder comprises determining a characteristic position in time of the combustion or duration of the combustion.

6. The method according to claim 1, wherein changing the amount of the second fuel introduced or the chemical composition of the prechamber charge comprises a decrease of an energy amount in the prechamber as compared to an energy amount in the main chamber if the mechanical stress of the at least one cylinder is above the predetermined thresholds.

7. The method according to claim 1, wherein changing the temperature of the cylinder charge comprises lowering the temperature of the cylinder charge if the mechanical stress is above respective predetermined thresholds.

8. The method according to claim 7, wherein the temperature of the cylinder charge is lowered by lowering a temperature of the first fuel.

9. The method according to claim 1, wherein monitoring the emission of the at least one cylinder comprises differentiating between NOx and HC emissions.

10. The method according to claim 9, wherein if the NOx emissions are above the predetermined thresholds, the amount of the second fuel introduced into the prechamber is changed to decrease an energy amount delivered by the second fuel into the prechamber.

11. The method according to claim 9, wherein if the HC emissions are above the predetermined thresholds, the amount of the second fuel introduced into the prechamber is changed to increase an energy amount in the prechamber as compared to an energy amount in the main chamber.

12. The method according to claim 1, wherein changing the temperature of the cylinder charge is effected by external exhaust gas recirculation such that if the temperature of the cylinder charge is increased an external exhaust gas recirculation rate is increased, and if the temperature of the cylinder charge is decreased the external exhaust gas recirculation rate is decreased.

13. The method according to claim 1, wherein the spark ignited engine comprises a variable valve train capable of varying individually with respect to the at least one cylinder, exhaust or intake valve timing or valve lift curves.

14. The method according to claim 13, wherein changing the temperature of the cylinder charge is effected by the variable valve train by closing an exhaust valve to increase internal exhaust gas recirculation and therefore increase the temperature of the cylinder charge or closing the exhaust valve to decrease the internal exhaust gas recirculation and therefore to decrease the temperature of the cylinder charge, respectively.

15. The method according to claim 13, wherein changing the temperature of the cylinder charge is affected by the variable valve train by reopening an already closed exhaust valve in an intake stroke of the piston thereby increasing the temperature of the cylinder charge.

16. The method according to claim 13, wherein changing the temperature of the cylinder charge is affected by the variable valve train by re-opening a closed intake valve during an exhaust stroke of the piston thereby increasing the temperature of the cylinder charge.

17. The method according to claim 1, wherein changing the temperature of the cylinder charge comprises either increasing back-pressure to increase the temperature of the cylinder charge or decreasing the back-pressure to decrease the temperature of the cylinder charge.

18. The method according to claim 1, wherein changing the temperature of the cylinder charge is affected by an additional introduction of the second fuel into the prechamber and igniting the prechamber charge before combustion in the main chamber in a gas exchange top dead center while intake and exhaust valves are closed.

19. A spark-ignited engine, the engine having at least one cylinder with a piston moveable in the at least one cylinder, a prechamber connected to a main chamber of the at least one cylinder, and a device to introduce a second fuel into the prechamber, the device having an electronic control unit configured to operate according to the method of claim 1.

20. The method according to claim 1, further comprising, if the mechanical stress of the at least one cylinder is above respective predetermined thresholds, individually, for the at least one cylinder, decreasing the temperature of the cylinder charge, and decreasing an energy amount of the chemical composition of the prechamber charge,
reducing the amount of the second fuel introduced into the prechamber, or,
delaying spark timing,
such that the mechanical stress of the at least one cylinder decreases below the predetermined thresholds.

* * * * *